Dec. 23, 1930. C. CRETORS 1,786,005
STIRRING MECHANISM FOR CORN POPPING APPARATUS
Original Filed Dec. 12, 1927 2 Sheets-Sheet 2

Inventor:
CHARLES CRETORS,
By Robert Burns,
Attorney.

Patented Dec. 23, 1930

1,786,005

UNITED STATES PATENT OFFICE

CHARLES CRETORS, OF CHICAGO, ILLINOIS

STIRRING MECHANISM FOR CORN-POPPING APPARATUS

Original application filed December 12, 1927, Serial No. 239,449. Divided and this application filed September 3, 1929. Serial No. 389,899.

This case is a division of the original application for patent of Charles Cretors, Serial No. 239,449, filed December 12th, 1927, and this invention relates to that class of corn popping apparatus in which the popping pan is of a shallow open top form having a removable lid or cover, and provided with heating means arranged beneath the flat bottom of the pan. And more particularly to that type of the apparatus in which the popping pan and its accessories have an inverting or turning movement to effect a discharge of the popped corn from out of the pan at the end of a popping operation, an example of which is the subject matter of my prior patent No. 1,201,807, dated October 17, 1919.

The objects of the present improvement are:

To provide a structural formation and combination of parts, in which the rotary stirrer blades or sweeps of the stirring means have their rotary carrying shaft, gear connection and driving shaft arranged in the upper portion of the popping pan chamber, remote from the heating element arranged beneath the bottom of the pan, so that but little if any lubrication of said mechanism is required in actual use, other than that supplied by the fat used in conditioning the material operated on, all as will hereinafter more fully appear.

Figure 1:
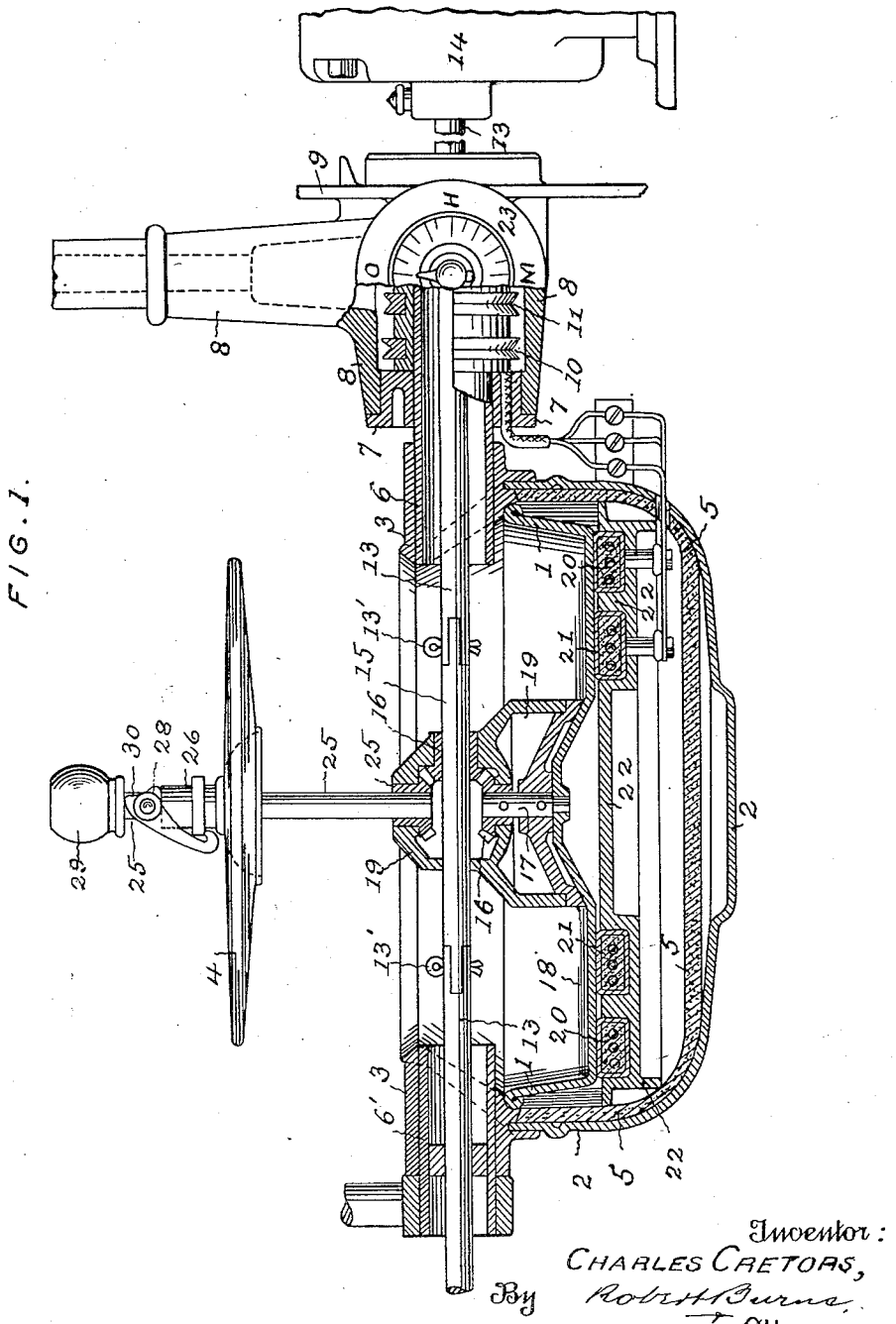
Figure 2:
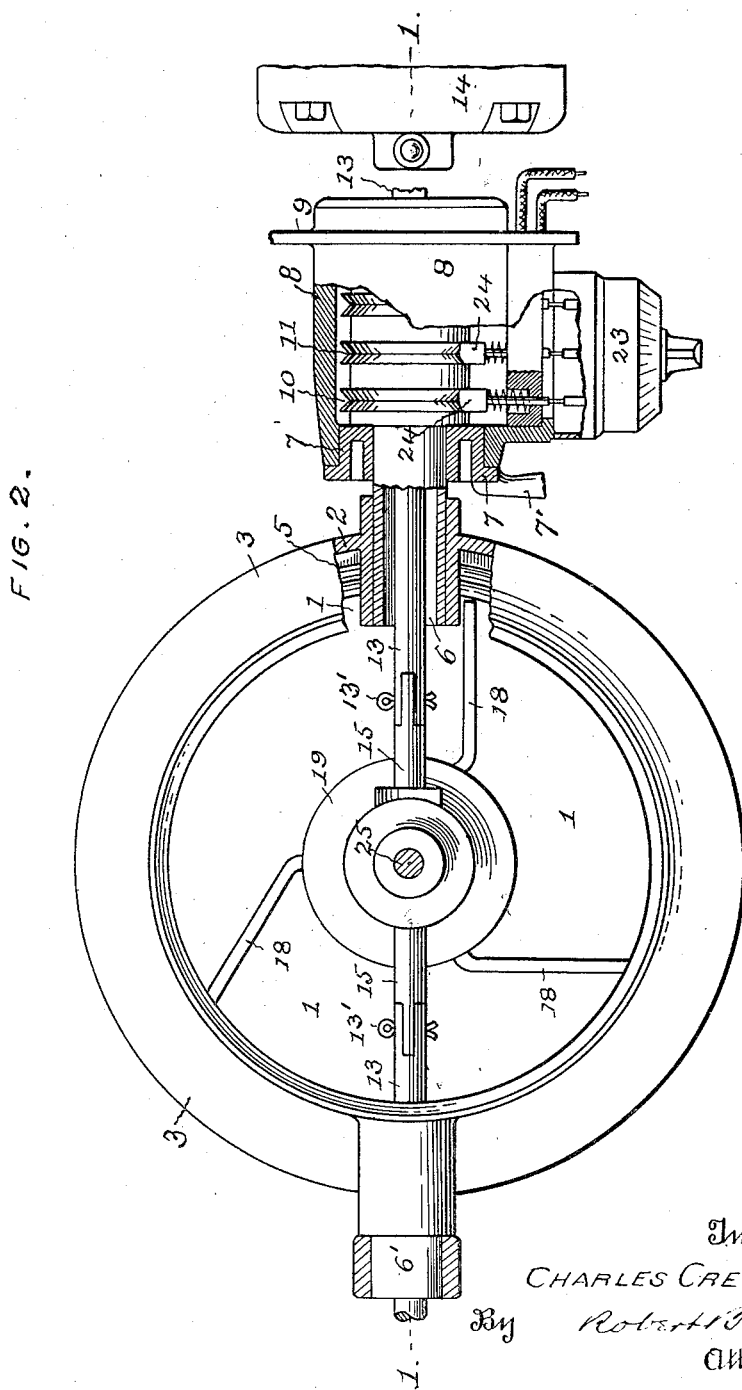

In the accompanying drawings:

Fig. 1 is a longitudinal section on line 1—1 Fig. 2, of the preferred form of the invention.

Fig. 2 is a plan view of the same with the cover removed and with parts broken away and in section.

Like reference numerals indicate like parts in both views.

In the present improvement the popping pan 1 with its accessories are revolubly supported on a stationary part of the apparatus, and are capable of a turning or inverting movement at the end of a popping operation to discharge a batch of the popped corn from the pan. The turning or inverting movement being attained by hand or in an automatic manner as described in my aforesaid Patent No. 1,201,807.

In the preferred form of the invention the popping pan 1 is of a shallow open top form and is enclosed and supported in and by an enclosing shell or housing 2 in connection with a top member 3 of a truncated cone form which is fixed to the top margin of the housing 2 to constitute a fixed centrally orificed top for the chamber for the popping pan 1. The above mentioned central orifice in the top member 3, is normally closed by a movable lid or cover 4 hereinafter described.

The enclosing shell or housing 2 is provided with a lining 5 of asbestos or like heat insulating material to prevent outward radiation of heat from the hereinafter described heating means for the popping pan.

A tubular sleeve 6 forming a fixed part of the aforesaid housing 2 extends on a radial line into the upper portion of the chamber of the popping pan 1, and extends away from said housing to form a journal bearing for said pan and housing. To such ends the sleeve 6 is formed with a fixed annular hub 7 revolubly mounted in a lateral neck 8 of a tubular post or standard 9 forming a part of the stationary frame of the apparatus, and as shown more particularly in Figs. 1 and 2.

For the purpose of effecting a manual turning movement or inversion of the popping pan 1 and housing 2, the hub 7 aforesaid is provided with an operating handle 7'' as shown in Fig. 1.

In addition to the annular hub 7, the tubular sleeve 6 carries in adjacent relation to said hub a pair of insulated contact rings 10 and 11 fixedly secured to said sleeve, and forming a part of the operating electric circuit supplying electro-motive force to the hereinafter described electrical heating units of the popping pan.

Centrally within the tubular sleeve 6, and extending diametrically across the chamber of the popping pan 1, a driving shaft 13 is revolubly supported, with one end connected to a power source, such as an electric motor 14.

Said driving shaft 13, is preferably formed in three aligned sections which are detachably connected together by interlocking tongue and groove and cotter pin connections 13' as shown in Figs. 1 and 2.

One of the outer sections of the aforesaid plurality of shaft sections has the above mentioned operative connections with the electric motor 14. The other of said outer sections has bearing in a secondary tubular sleeve 6' on the enclosing housing 2 and is extended away from said housing 2 for operative connection with a mechanism or device having associated relation with the present mechanism. The central section 15 of the plurality of shaft sections is journalled on the hereinafter described casing 19 and is operatively connected by a pair of bevel gears 16 with an upright shaft 17 arranged centrally of the popping pan 1 and carrying at its lower end the usual radial stirrer blades 18 that move in contact with the bottom of the popping pan 1 to stir or agitate the material being treated.

To prevent contact of the material undergoing treatment in the popping pan 1 with the stirrer carrying shaft 17, bevel gearing connections 16 etc., the enclosing casing 19 above referred to is provided, and the same is arranged at the center of the popping pan to enclose and house said parts and at the same time provide an upper bearing for the stirrer shaft 16, as illustrated in Fig. 1.

In connection with the above described arrangement of parts, the before described sectional formation of the operating shaft 13, admits of a disengagement of the central shaft section 15 from the center shaft sections, and a removal of the casing 19 and parts attached thereto, and including the central shaft section, from the chamber of popping pan for cleaning, repairing and the like.

The heating means for the popping pan 1 is preferably of the electrical resistance type and preferably comprising a pair of annular resistance units 20 and 21 arranged in spaced and concentric relation to each other and to the central point of the popping pan 1. As shown in Fig. 1, the annular units 20 and 21 are arranged in open top annular channels of a supporting base 22, which is in turn fixedly attached in the interior of the enclosing housing 2 of the pan 1 and adapted to maintain the heating units 20, 21 and close contact with the bottom wall of said pan, with the supply and return lines of said units embracing an electrical controlling switch 23 adapted to connect the electric supply to one or the other of the heating units 20 and 21 singly or collectively in accordance with the degree of temperature desired in the operation of the apparatus.

In the above described construction the heating units 20, 21 have a turning movement in unison with that of the popping pan 1 and enclosing housing 2, and in that it is desirable to maintain a constant electric supply to the units, the electric supply lines leading to said units lead to the heretofore described insulated contact rings 10 and 11, while the electric supply lines leading from the switch 23 have conducting contact with the aforesaid contact rings 10 and 11 by contact shoes or brushes 24 of any usual construction.

The heretofore described arrangement of the tubular sleeve 6 operating shaft 13, and bevel gears 16 in the upper portion of the chamber of the popping pan 1, is a material part of the present invention, in that said parts being remote from the heating effects of the heating units 20, 21 as arranged beneath the popping pan 1. It has been found in extended practical use that such arrangement dispenses with the need of separate lubrication of the bevel gear 11 and other adjacent parts, in that the butter or like fats used as a conditioning means in the operation of popping corn will supply the proper amount of lubricant to said parts.

The closure head or cover 4 for the central opening at the top of the chamber of the popping pan 1 is of a circular form, and has movement to and from said opening preferably in the semi-automatic manner described in my prior Patent No. 728,550 of May 19, 1903, upon a centrally arranged guide stem or post 25 that is journalled at its lower end in the upper end of the aforesaid casing 19 by a bevel gear wheel 25' which in turn gears with and is driven by the bevel gear wheel 16 in the driving shaft section 15 aforesaid.

With the mechanisms in the position for effecting the popping operation, as shown in full lines in Fig. 1 the closure head or cover 4 moves into and is held in a closed condition by gravity alone, so as to admit of an upward movement of the cover by the expansion for the corn undergoing treatment as the popping operation progresses.

With the completion of the popping operation, and a semi-revolution of the popping pan 1 and its accessories, to attain a discharge of the finished product from the popping pan, the closure head or cover 4 aforesaid will move by gravity on the guide stem 25 into an open condition, as illustrated in full lines in Fig. 1, and with a view to maintain such cover 4 in such last mentioned open condition pending a discharge of the pan contents and a return of the pan etc. to the above described popping position, a latching means is provided as follows:

The cover 4 is provided with a fixed annular collar 26 a short distance above its upper surface, adapted for engagement with a latch hook 27 pivoted on the aforesaid guide stem or post 25 to hold the cover in the open condition above referred to. The positive operation of said latch hook 27 to the described engagement is effected by a lateral lug 28 on said hook, which by contact with the adjacent end of the collar 26 of the cover 4, acts to move the latch hook 27 into the described engagement.

The release of the cover 4 from the above described engagement is effected by a knob 29 slidingly mounted on an end of the guide stem 25 with its lower end in operative contact with a cam extension 30 of the latch hook 27, so that with a downward movement of the knob 29 by the operator a rocking movement of the latch hook 27 away from the collar 26 of the cover 4 is effected.

Having thus fully described my invention what I claim and desire to secure by Letters Patent, is:—

1. In corn popping apparatus in which the popping pan is of an open top reversible form and journalled by a radially extending tubular sleeve in a stationary side supporting upright, the combination of a stirring means adapted for central location in a popping pan, and an associated operating mechanism, the same comprising a non-revoluble hollow casing formed with horizontal and vertical bearings, a radially arranged shaft journalled in the horizontal bearing of said casing and having an extension adapted for central passage through the tubular journal sleeve of a popping pan and operative connection with a power source, a secondary shaft journalled in a vertical bearing of said casing, the carrying hub of the stirrer means having fixed attachment to said vertical shaft, and angle gear wheels operatively connecting said shafts together.

2. In a corn popping apparatus in which the popping pan is of an open top reversible form and journalled by a radially extending tubular sleeve in a stationary side supporting upright, the combination of a stirring means adapted for central location in a popping pan, and an associated operating mechanism, the same comprising a non-revoluble hollow casing formed with horizontal and vertical bearings, a radially arranged shaft journalled in the horizontal bearing of said casing and having an extension adapted for central passage through the tubular journal sleeve of a popping pan and operative connection with a power source, a secondary shaft journalled in a vertical bearing of said casing, the carrying hub of the stirrer means having fixed attachment to said vertical shaft, and angle gear wheels operatively connecting said shafts together, said horizontal shaft being formed in sections detachably coupled together, with an intermediate section carrying one of the aforesaid gear wheels.

3. In a corn popping apparatus in which the popping pan is of an open top reversible form and journalled by a radially extending tubular sleeve in a stationary side supporting upright, the combination of a stirring means adapted for central location in a popping pan, and an associated operating mechanism, the same comprising a non-revoluble hollow casing formed with horizontal and vertical bearings, a radially arranged shaft journalled in the horizontal bearing of said casing and having an extension adapted for central passage through the tubular journal sleeve of a popping pan and operative connection with a power source, a pair of aligned and vertically arranged shafts journalled in the vertical bearings of said casing, the carrying hub of the stirrer means having fixed attachment to one of said vertically aligned shafts, the other of said shafts being adapted for operative engagement with a movable element of the popping pan, and angle gear wheels operatively connecting the plurality of shafts together.

4. In a corn popping apparatus in which the popping pan is of an open top reversible form and journalled by a radially extending tubular sleeve in a stationary side supporting upright, the combination of a stirring means adapted for central location in a popping pan, and an associated operating mechanism, the same comprising a non-revoluble hollow casing formed with horizontal and vertical bearings, a radially arranged shaft journalled in the horizontal bearing of said casing and having an extension adapted for central passage through the tubular journal sleeve of a popping pan and operative connection with a power source, a pair of aligned and vertically arranged shafts journalled in the vertical bearings of said casing, the carrying hub of the stirrer means having fixed attachment to one of said vertically aligned shafts, the other of said shafts being adapted for operative engagement with a movable element of the popping pan, and angle gear wheels operatively connecting the plurality of shafts together, said horizontal shaft being formed in sections detachably coupled together with an intermediate section carrying one of the aforesaid gear wheels.

In testimony whereof I hereunto affix my signature.

CHARLES CRETORS.